United States Patent [19]
Anderson

[11] 3,782,086
[45] Jan. 1, 1974

[54] SPRING-LOADED GAUGE ROLLER
[75] Inventor: John Dale Anderson, Canton, Kans.
[73] Assignee: Hesston Corporation, Hesston, Kans.
[22] Filed: Apr. 9, 1973
[21] Appl. No.: 349,078

[52] U.S. Cl.............. 56/344, 56/13.3, 56/328, 280/43.18
[51] Int. Cl............................................. A01d 89/00
[58] Field of Search.............. 56/328 R, 330, 30, 56/249–254, 320.1, 17.1, 17.4, 263, 344–364, 341–343; 280/43.14, 43.18, 43.24

[56] References Cited
UNITED STATES PATENTS

| | | | |
|---|---|---|---|
| 2,781,625 | 2/1957 | Phelps et al.................... | 56/328 R |
| 2,978,859 | 4/1961 | Tubbs............................. | 56/328 R |
| 3,106,813 | 10/1963 | Strasel........................... | 56/249 |
| 3,424,471 | 1/1969 | Bornzin.......................... | 280/43.18 |
| 3,468,112 | 9/1969 | Landgrebe...................... | 56/364 |
| 3,691,741 | 9/1972 | White et al..................... | 56/344 |
| 3,732,672 | 5/1973 | Adee et al...................... | 56/13.3 |

*Primary Examiner*—Russell R. Kinsey
*Attorney*—Schmidt, Johnson, Hovey & Williams

[57] ABSTRACT

A crop pickup component of a farm implement is floatingly supported by a four point linkage and associated springs that are, in turn, coupled with a swingable gauge roller in such manner as to yieldably bias the latter toward the ground so that shocks are absorbed as the roller follows the ground contours while the crop is being gathered and loaded.

10 Claims, 5 Drawing Figures

PATENTED JAN 1 1974  3,782,086
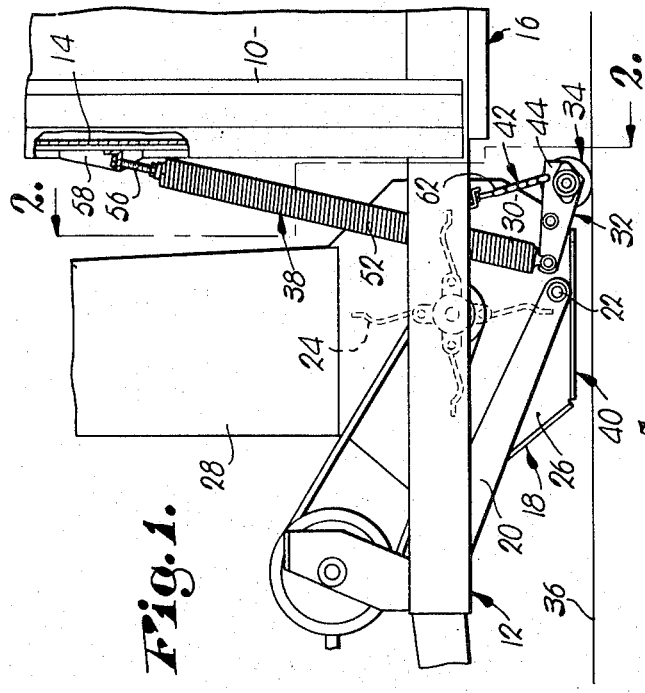
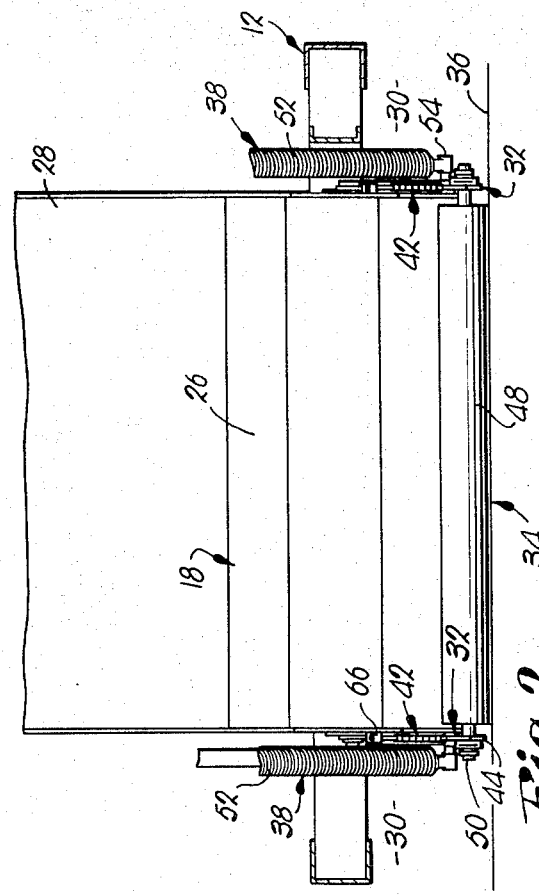
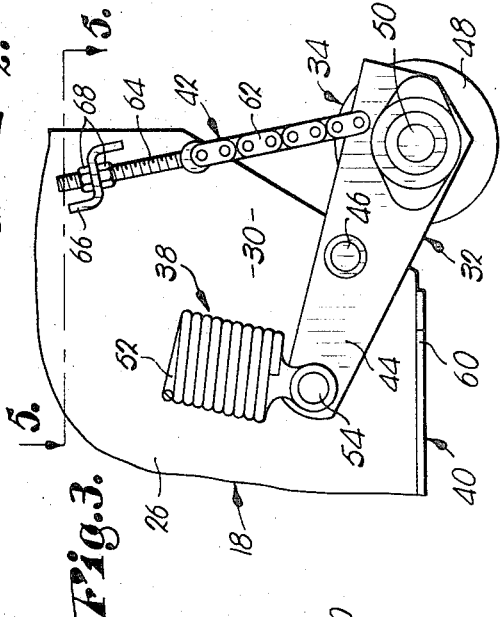
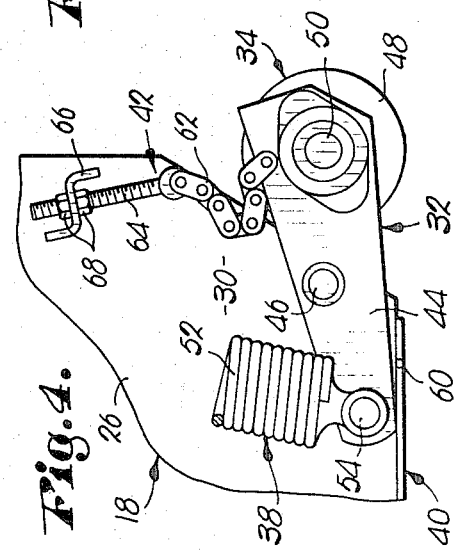
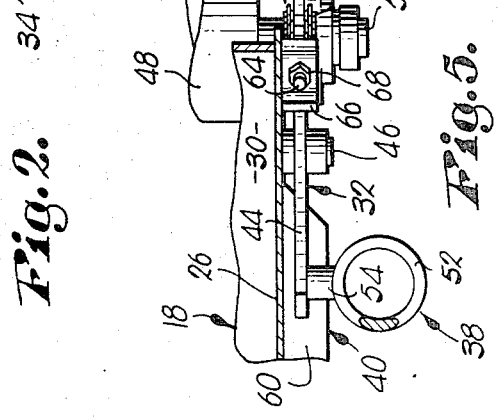

3,782,086

SPRING-LOADED GAUGE ROLLER

In the spring flotation of headers and the like for farm implements it is the usual practice to limit the extent of downward movement of the floating component by gauge wheels or rollers. However, as the gauge means follow the ground contour considerable shock is imparted to such component, and thence to other parts of the implement, resulting in decreased operating efficiency, breakages, failures and shortened life.

According to my present invention the gauge roller is itself swingable and the flotation springs are tied in with the roller such as to maintain the flotation effect, continue the function of the roller as a gauge and add thereto a shock absorbing improvement not heretofore made possible by conventional arrangements.

In the drawing:

FIG. 1 is a fragmentary side elevational view of a farm implement showing a spring-loaded gauge roller embodying the improvements of my present invention;

FIG. 2 is a fragmentary front elevational view thereof;

FIG. 3 is an enlarged fragmentary side elevational view similar to FIG. 1, parts being broken away for clearness;

FIG. 4 is a view similar to FIG. 3 but showing the gauge roller in a different position; and FIG. 5 is a fragmentary cross-sectional view taken on line 5—5 of FIG. 3.

The improvements about to be described relate generally to the subject matter of U. S. Pat. Nos. 3,556,327; 3,691,741; 3,732,672 and D. 224,032 each disclosing a farm implement for picking up a fid crop from a windrow, blowing it into a wagon box, compressing the loaded crop in the box to form a stack and discharging the stack from the box.

Hence, the drawings hereof show an implement 10 of that type with a framework which includes a chassis 12 and an upright frame piece 14 of a wagon box 16. A pickup component 18 is mounted on the chassis 12 for up-and-down swinging movement toward and away from the ground through four point linkage which includes a pair of lower links, one only being shown and designated 20. The link 20 has a pivotal connection with the chassis 12 (not shown) and with the pickup 18 at 22.

The pickup component 18 includes a rotor 24 for raising the crop out of the windrow and blowing it upwardly from housing 26 for rotor 24 through an upright duct 28 carried by the housing 26. The crop discharges from an upper outlet and of the duct 28 (not shown) into the box 16. Another pair of links (not shown) similar to link 20 pivotally connects the duct 28 with the box 16.

In accordance with my present invention there is provided a shock absorbing assembly 30 which includes structure 32 mounted on the housing 26 for up-and-down swinging movement relative to the parts 20, 22, 24, 26 and 28 of the pickup 18. The assembly 30 also includes gauge means 34 supported on the structure 32 for movement along the ground 36 during travel of the implement, and resilient flotation means 38 interconnecting the box 16 and the structure 32 for swinging the latter in a direction yieldably biasing the gauge means 34 toward the ground 36. Moreover, the assembly 30 is provided with stop means 40 and 42 for limiting the extent of swinging movement of the structure 32.

The structure 32 includes a pair of horizontally spaced arms 44 pivoted at 46 to the housing 26 intermediate the ends of the arms 44 for swinging movement about aligned axes traversing the path of travel of the implement 10. The gauge means 34 is in the nature of an elongated roller 48 spanning the distance between the arms 44 behind the housing 26 and carried by the rearmost ends of the arms 44 for rotation along the ground 36 about a normally horizontal axis 50 parallel with the axes of the pivots 46. The flotation means 38 is in the nature of a pair of coil springs 52 embracing the housing 26, pivoted at 54 to the arms 44 at their forwardmost ends and extending upwardly from the arms 44. Bolts 56 for adjusting the tension of the springs 52 connect the latter to brackets 58 rigid to the frame pieces 14.

Stop means 40 are outturned flanges 60 on the housing 26 disposed beneath the forwardmost ends of the arms 44 for engagement thereby as seen in FIG. 4. The flexible stop means 42 for each arm 44 respectively include a chain 62 pivotally connecting arms 44 adjacent the roller 48 with a bolt 64. The bolt 64 passes loosely through a bracket 66 on the housing 26 and is releasably held in place by a pair of lock nuts 68 clamped to the bracket 66 for adjusting the lengths of the stop means 42.

In operation, the two bolts 56 and the two bolts 64 are adjusted so that under normal conditions, with the roller 48 rolling along level terrain 36, the springs 52 yieldably bias the roller 48 against the ground 36 with the chains 62 slack such that the flotation means 38 and the gauge means 34 cooperate in floatingly supporting the pickup component 18.

Hence, during travel of the implement 10, as the roller 48 encounters dips in the terrain 36, it will be eased downwardly into such dips by the yieldable action of the springs 52 without shock to the pickup 18 or other components of the implement 10, limited only by the overall length of the stop means 42 as adjusted through use of the nuts 68 on the bolts 64.

On the other hand, when the roller 48 encounters rises in the terrain 36, here again the roller 48 rolls up and over such rises, absorbing the shock while the chains 62 flex still further as shown in FIG. 4, the yieldability of the springs 52 causing such shock absorbing advantages, limited only by the stop means 40 as shown in FIG. 4.

Thus, throughout the extent of swinging movement of the arms 44 from the position shown in FIG. 3 to the position shown in FIG. 4, the springs 52 continue to floatingly support the pickup component 18 because of the yieldable bias maintained on the arms 44 and therefore on the roller 48 by the springs 52, the tension of which is determined by adjustment of the bolts 56.

Having thus described the invention, what is claimed as new and desired to be secured by Letters Patent is:

1. In combination with a farm implement having a framework supporting a component of the implement for up-and-down movement toward and away from the ground, a shock absorbing assembly comprising:

structure mounted on said component for up-and-down swinging movement relative to the latter;

gauge means supported on said structure for movement along the surface of the ground during travel of said implement; and flotation means interconnecting said framework and said structure for swinging the latter in a direction yieldably biasing said gauge means toward the ground.

2. In an assembly as claimed in claim 1; and stop means for limiting the extent of swinging movement of said structure.

3. In an assembly as claimed in claim 1 wherein said flotation means is resilient.

4. In an assembly as claimed in claim 1 wherein said gauge means is mounted on said structure for rotation when moving over the surface of the ground.

5. In an assembly as claimed in claim 1 wherein said structure includes a pair of horizontally spaced arms swingable about aligned axes traversing the intended path of said travel of the implement.

6. In an assembly as claimed in claim 5; and flexible means at one end of each arm respectively coupling the same with said component for limiting the extent of swinging movement of the arms in one direction.

7. In an assembly as claimed in claim 5 wherein said gauge means spans the distance between the arms and is secured to the arms at one end of the latter for rotation when moving over the surface of the ground about an axis parallel with said aligned axes.

8. In an assembly as claimed in claim 7 wherein said flotation means includes a coil spring connected to each arm respectively at the opposite end thereof and extending upwardly from the arms.

9. In an assembly as claimed in claim 8 wherein said component is provided with a stop beneath said opposite end of each arm respectively from limiting the extent of swinging movement of the arms in one direction.

10. In an assembly as claimed in claim 9; and flexible means at said one end of each arm respectively coupling the same with said component for limiting the extent of swinging movement of the arms in the opposite direction.

* * * * *